United States Patent [19]
Pedersen

[11] Patent Number: 5,251,716
[45] Date of Patent: Oct. 12, 1993

[54] TWO-LOOP STEERING SYSTEM FOR MOTOR VEHICLES

[75] Inventor: Harry E. Pedersen, Nordborg, Denmark

[73] Assignee: Danfoss A/S, Nordborg, Denmark

[21] Appl. No.: 767,464

[22] Filed: Sep. 30, 1991

[30] Foreign Application Priority Data

Oct. 9, 1990 [DE] Fed. Rep. of Germany ....... 4031969

[51] Int. Cl.$^5$ .............................................. B62D 5/08
[52] U.S. Cl. ..................................... 180/133; 180/132
[58] Field of Search ....................... 180/133, 132, 141

[56] References Cited

U.S. PATENT DOCUMENTS

| | | |
|---|---|---|
| 3,692,138 | 9/1972 | Witt ...................................... 180/133 |
| 3,730,288 | 5/1973 | Dean ..................................... 180/133 |
| 3,820,620 | 6/1974 | Miller et al. ......................... 180/133 |
| 4,476,677 | 10/1984 | Hanshaw ......................... 180/133 X |
| 4,798,256 | 1/1989 | Fassbender ......................... 180/133 |

*Primary Examiner*—Joseph D. Pape
*Attorney, Agent, or Firm*—Wayne B. Easton

[57] ABSTRACT

The steering system of a motor vehicle includes a steering motor having the application of pressurized fluid applied thereto by a main loop and in the event of a fault in the main loop by an auxiliary loop with the main loop isolated from the auxiliary loop. The motor includes a first and a second chamber. A first change over valve is fluidly connected to the first chamber of the motor while a second change over valve is fluidly connected to the second chamber. During normal operation the steering wheel is connected through a change over device to the main loop but in the event of a main loop fault, connected through said device to the auxiliary loop. Each loop includes a pump fluidly connected to a steering unit which is fluidly connected by one motor line connected to the first change over valve and a second motor line fluidly connected to the second change over valve. Each valve has a slider in one position fluidly connecting the main loop to the motor chambers and in a second position to the auxiliary loop to the motor chambers. Control circuit dependent on main loop pressure changes the change over device from connecting the steering wheel to the main loop to the auxiliary loop and to move the sliders.

1 Claim, 1 Drawing Sheet

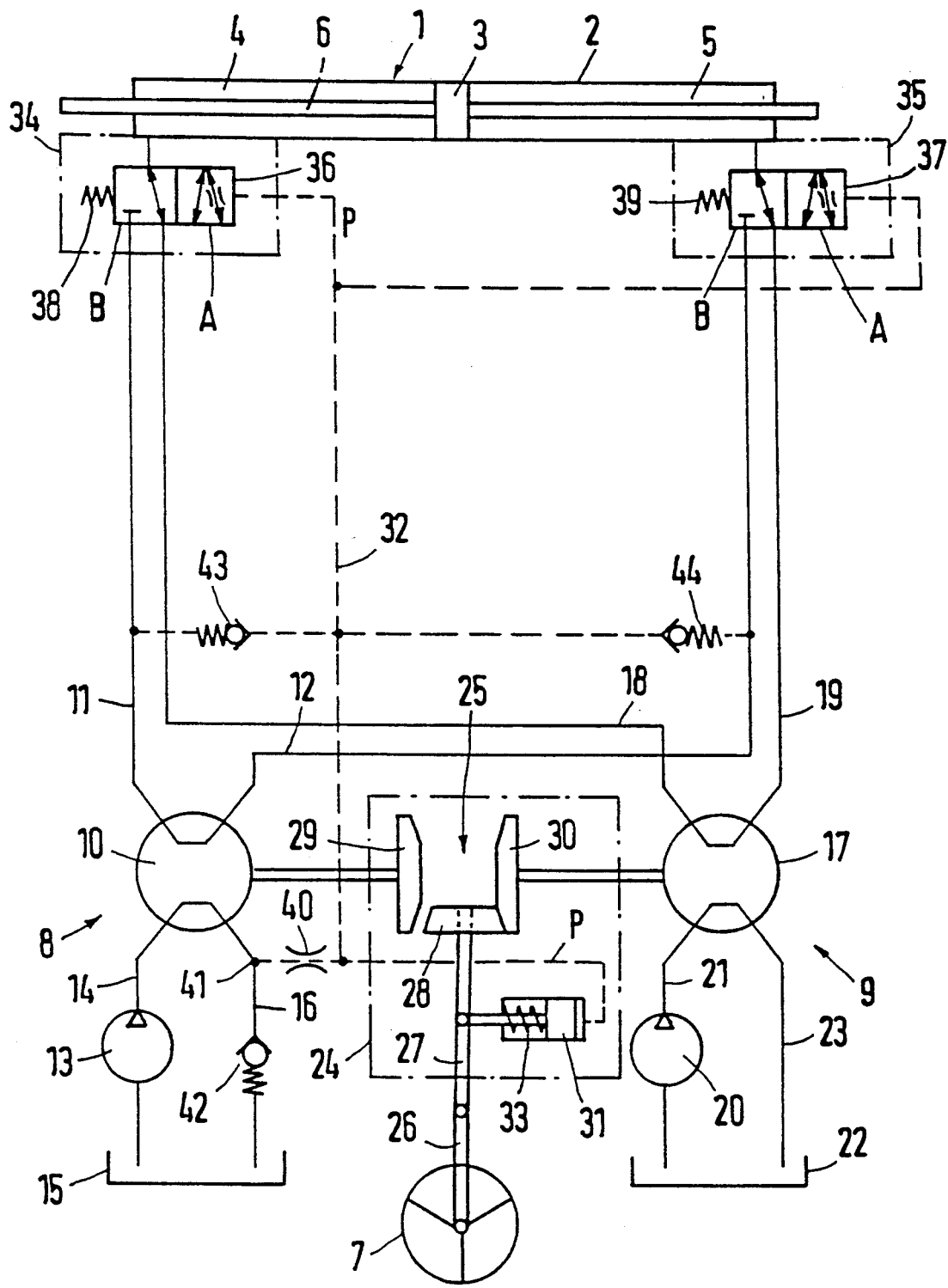

TWO-LOOP STEERING SYSTEM FOR MOTOR VEHICLES

FIELD OF THE INVENTION

The invention relates to a two-loop steering system for motor vehicles with a steering hand wheel and a steering motor, which can be supplied with pressurized fluid by way of a main loop and an auxiliary loop, each of which loops comprises a tank, a and a steering unit.

BACKGROUND OF THE INVENTION

In a known steering system of this kind (U.S. Pat. No. 3,730,288 ), the main loop and the auxiliary loop are of identical construction. They work parallel to one another on a steering motor with two cross-connected cylinders. If one loop fails, the steering system is still capable of being operated with the aid of the other loop. However, both steering units have to be operated with the steering hand-wheel. The required moment is therefore about twice as high as it is with a single-loop steering system and steering is sluggish.

The invention is based on the problem of providing a two-loop steering system for motor vehicles of the kind mentioned in the introduction, in which sluggish steering is avoided whilst nevertheless ensuring that the steering system continues to operate safely when one loop fails.

This problem is solved according to the invention in that a change-over device connects the steering hand-wheel in normal operation to the main loop steering unit and in the event of a fault in the main loop connects it to the auxiliary loop steering unit, and each motor chamber of the steering motor is connected with the aid of a change-over valve in normal operation to a motor line of the main loop steering unit and in the event of a fault in the main loop to the associated motor line of the auxiliary loop steering unit, with the motor line of the main loop steering unit being isolated.

With this construction, in normal operation only the main loop is effective and in the event of a fault in the main loop (failure of the pump, line break and so on) only the auxiliary loop is effective. The consequence of this is that the operator needs to adjust only one steering unit using the steering handwheel, that is to say, steering is smooth, as usual. The change-over valve associated with each motor chamber ensures that in an emergency the main loop is completely separated from the auxiliary loop, and a line break in the main loop or other fault cannot have an adverse effect on the auxiliary loop or on the steering. It is a further advantage that in normal operation and in an emergency the same motor chambers are pressurized, so that there is no substantial difference in driving performance either. This also applies when two cross-connected cylinders are used as the steering motor. Alternatively, however, a single cylinder with two motor chambers can be used.

It is especially advantageous for the change-over valves to be arranged on the steering motor. This means that the motor lines of both steering units are guided as far as the steering motor, but there is no common conduit for the main loop and the auxiliary loop between the change-over valve and the steering motor. There are therefore no conduit sections that are common to both loops which in the event of a break would thus lead to a complete failure.

It is preferable for a control pressure line, which in the event of a fault in the main loop carries a different pressure from that in normal operation, to be provided, and for the change-over device and/or the change-over valve, of which there is at least one, to be operable in dependence on the control pressure. Such a control pressure line can readily be provided in a steering system. The control pressure can be used not only as a signal but also as an energy carrier. The change in pressure is a reliable signal for the occurrence of a fault.

In particular, the control pressure line can be connected by way of a throttle to the tank line of the main loop steering unit between the steering unit and a pressure-maintaining device, and also to both motor lines of the main loop steering unit by way of a respective non-return valve opening towards the motor line. Whereas the control pressure in normal operation assumes the value preset by the pressure-maintaining device, it falls to atmospheric pressure when there is a break in the pump line, the tank line or one of the motor lines, or when the pump fails.

The change-over device can be adjustable in particular mechanically by means of a piston biassed by the control pressure and in the opposing direction by a spring.

Similarly, the change-over valve, of which there is at least one, may comprise a piston slider biassed by the control pressure and in the opposing direction by a spring.

The change-over device is preferably a change-over gear. A small adjustment movement connects the driving gearwheel selectively to the one or other driven gearwheel. Change-over clutches and other change-over devices are possible alternatives.

The invention is explained in detail below with reference to a preferred embodiment illustrated in the drawing.

DESCRIPTION OF THE DRAWING

The single drawing shows a circuit diagram of the steering system according to the invention in the emergency setting.

DESCRIPTION OF PREFERRED EMBODIMENT

A steering motor 1 comprises a cylinder 2 with a piston 3 which separates two motor chambers 4 and 5 from one another. The piston rod 6 is connected to the wheels to be steered.

This steering motor 1 can be operated by a steering handwheel 7 with the aid of a main loop 8 and an auxiliary loop 9. The main loop comprises a main loop steering unit 10 which is provided with two motor lines 11 and 12, a pump line 14 containing a pump 13 and a tank line 16 leading to the tank 15. The auxiliary loop 9 has an auxiliary loop steering unit 17 which is provided with two motor lines 18 and 19, a pump line 21 containing a pump 20 and a tank line 23 leading to the tank 22. The pump 13 is driven in particular by the motor of the motor vehicle. The pump 20 should have a drive as far as possible independent thereof, for example a drive connected to a wheel axle or an electrical drive. The steering units can be of any commercial type, for example of type OSPC manufactured by the Applicant, in which the steering motor 1 is supplied with an amount of pressurized fluid corresponding to the angle of rotation of the steering handwheel 7.

The steering handwheel 7 can be connected by way of a change-over device 24, which comprises a change-over gear 25, to the main loop steering unit 10 or to the auxiliary loop steering unit 17. For that purpose, the output shaft 26 of the steering handwheel 7 is connected by way of an articulated shaft 27 to a pinion 28, which can engage either with a bevel gear 29 associated with the main loop steering unit or with a further bevel gear 30 associated with the auxiliary loop steering unit. The change-over is effected with the aid of a piston 31, which is biassed at one end by the control pressure p in a control pressure line 32 and at the other end by a spring 33.

Two change-over valves 34 and 35 are flange-mounted on the cylinder 2 of the steering motor 1. Their respective schematically illustrated sliders 36 and 37 are also biassed in the one direction by the control pressure p and in the other direction by a respective spring 38 and 39.

The control pressure line 32 is connected at one end by way of a throttle 40 to a point 41 in the tank line 16 which lies between the steering unit 10 and a pressure-maintaining device 42, which is constructed as a spring-biassed non-return valve and allows a pressure of, for example, 5 bars or more to prevail at the point 41. At the other end, the control pressure line 32 is connected to the two motor lines 11 and 12 of the main loop 8 by way of a respective, preferably spring-biased non-return valve 43, 44.

This provides for the following mode of operation: In normal operation the change-over valves 34 and 35 are in position A and the pinion 28 is engaged with the bevel gear 29. When the steering handwheel 7 is turned the steering motor 1 is operated solely by way of the main loop 8. If the control pressure p drops, the change-over device 24 changes over to the bevel gear 30 and the two change-over valves 34 and 35 assume position B. The steering motor 1 is now driven solely by the auxiliary loop 9, while the main loop 8 is completely separated from the auxiliary loop by the change-over valves.

As position A shows, such a complete separation of the auxiliary loop 9 from the main loop 8 is not required in normal operation, because the reserve auxiliary loop normally has no faults. This facilitates the selection of the change-over valves. For example, the OLSB valve manufactured by the Applicant, which is normally used as a priority valve, can be used for that purpose.

In normal operation there is a control pressure p of about 5 bars or more at the point 41 and thus in the entire control pressure line 32. If the pump line 14 breaks, the pressure at the point 41, and thus also the pressure in the control line 32, drops to atmospheric pressure. The same applies if the pump 13 fails. If a motor line 11 or 12 breaks, the associated non-return valve 43 or 44 opens and the control pressure again drops to atmospheric pressure. All these faults therefore cause the change-over device 24 and the change-over valves 34, 35 to change over, so that the auxiliary loop 9 becomes effective in emergency operation. A line break between the change-over valve and the steering motor 1 need not be feared since these parts are flange-mounted on one another.

Instead of the two change-over valves 34 and 35 used, a common change-over valve can be used. If the number of change-over possibilities is doubled, the described principle can also be applied to a steering motor with two cross-connected cylinders and accordingly four motor chambers.

I claim:
1. A steering system for motor vehicles, comprising,
main and auxiliary circuit loops,
a steering motor having oppositely effective expansible chambers,
two changeover valves connected respectively to said chambers with each of said valves having primary and auxiliary operating positions,
each of said loops having a steering unit with pump and tank means associated therewith,
each of said steering units having associated left and right motor lines connected respectively to said changeover valves,
each of said steering units having steering control means for selectively and alternately effecting the pressurizing and exhausting of the left and right motor lines associated therewith,
steering handwheel means having primary and auxiliary operating positions and being selectively connectable with and cooperable with either of said steering control means to effect operation thereof,
said changeover valves and said steering handwheel means each being pressure operable to effect said primary position and being spring biased to effect said auxiliary position in the absence of pressure being applied thereto,
and control pressure line means connected to said pump means of said steering control unit in said main loop to said changeover valves and to said steering handwheel means to establish said primary operating positions for said changeover valves and said steering handwheel means when said control pressure line means is pressurized.

* * * * *